United States Patent [19]

Hellberg

[11] 4,382,559
[45] May 10, 1983

[54] DEFIBRATOR

[75] Inventor: Enar V. Hellberg, Brussels, Belgium

[73] Assignee: Sunds Defibrator Aktiebolag, Sundsvall, Sweden

[21] Appl. No.: 210,387

[22] Filed: Nov. 17, 1980

[30] Foreign Application Priority Data

Nov. 19, 1979 [BE] Belgium ................................. 198187

[51] Int. Cl.³ ............................................. B02C 13/13
[52] U.S. Cl. .............................. 241/79.3; 241/152 A; 241/244
[58] Field of Search ...................... 241/79.3, 226, 229, 241/280, 281, 242, 250, 227, 78, 152 A, 154, 157, 163, 78, 159, 183, 187, 188 R, 191, 15

[56] References Cited

U.S. PATENT DOCUMENTS 964,102  7/1910  Gordon .............................. 241/162
2,978,291  4/1961  Cumpston, Jr. ................ 241/242 X Primary Examiner—Willie G. Abercrombie
Attorney, Agent, or Firm—Martin Smolowitz

[57] ABSTRACT

The invention relates to a defibrator comprising at least one rotary cylindrical drum provided on its inner surface with longitudinal deflectors, driven in rotation and axially supplied with material which is to be defibrated. On the inside, the defibrator comprises a rotor consisting of a shaft coaxial with the cylindrical drum, and longitudinal blades branching off radially from the shaft and having ends which are curved in the direction of rotation, capable of receiving the material which is to be defibrated and of projecting it on to the inner wall of the drum.

16 Claims, 4 Drawing Figures

DEFIBRATOR

BACKGROUND OF THE INVENTION

The invention relates to a defibrator for recycled materials such as waste paper.

In the known apparatus of the prior art, the material, such as waste paper, is defibrated by repeatedly falling against a hard surface, and this falling develops shearing forces which convert the paper into fibres without disintegrating the unwanted substances.

The operation is carried out in a rotating drum into which paper, moistened by the addition of water, is fed axially at one end. On its inner peripheral surface, the drum comprises longitudinal deflectors which lift the material when the drum rotates and lets it fall back just before it reaches the top of the drum, thus causing defibration. As the drum is slightly inclined relative to the horizontal, the material travels from the upstream to the downstream end of the drum, and during its retention time (18 to 20 minutes) in the drum, it is made to fall from the top of the drum on to the inner surface at the bottom 200 to 250 times.

The material then passes into a separator drum, also rotating, known as a sorting drum, having a perforated surface. Water is projected over the outer surface of the drum, thus forcing inwards any material lodged in the perforations. The fibres suspended in the water escape through the perforations in the bottom part of the rotating drum, whilst foreign matter (wires, plastics, etc.) are evacuated from the drum at the end of said drum.

These known machines have a variety of disadvantages:

the defibrating drum has to be considerable in size: in diameter, because the material has to fall from a sufficient height to produce the shearing forces needed for defibration; and in length, to ensure that any one portion of material is subjected to a sufficient number of falls in the course of its passage from the upstream to the downstream end of the defibrating drum;

the drive torque to be applied to the drum is considerable, as the material is all contained in one side of the drum. This also results in an imbalance which fatigues the bearings and causes premature wear thereof;

as the drum operates in only half its section, the space taken up by the drum is not used to full advantage.

SUMMARY OF THE INVENTION

The apparatus according to the invention is based on the idea that the material is defibrated by its contact with a moving hard substance, and it is therefore advantageous to multiply these contacts. For this purpose, the invention provides a defibrator comprising at least one rotary cylindrical drum provided on its inner surface with longitudinal deflectors, and driven in rotation and axially supplied with material to be defibrated, characterised in that it comprises, on the inside, a rotor consisting of a shaft coaxial with the cylindrical drum and longitudinal blades branching radially off the shaft, and having ends which are curved in the direction of rotation, capable of receiving the material which is to be defibrated and projecting it on to the inner wall of the drum.

Thus, the material is subjected to contact with a moving hard substance twice each time the drum rotates: once when it meets the surface of the blades of the rotor and again when it is projected against the inner surface of the drum.

In a preferred embodiment of the invention, the rotor rotates in the same direction as the drum. The angular velocity of the drum is of the order of 15 to 30 r.p.m. and the angular velocity of the rotor is of the order of 100 to 200 r.p.m.

According to another advantageous feature, the blades of the rotor are slightly helicoidal so as to promote the advance of the material from the upstream to the downstream end of the rotor.

In a preferred arrangement, the defibrating drum mentioned hereinbefore is preceded by a shredder drum into which the material is fed radially by means of an upper hopper and falls through openings formed in the cylindrical surface of the drum, on to a rotor similar to that of the defibrating drum. This apparatus comprising the shredder and the defibrator is followed by a sorting section, which is known per se, which advantageously contains small blades mounted on a rotor the axis of which is concentric with the axis of the drum.

Advantageously, the drums of the shredding, defibrating and sorting sections are integral and driven in rotation from outside, and the shaft carrying the blades of the shredder, the blades of the defibrator and the small blades of the rotor in the sorting section is in one piece, driven by a separate motor.

The advantages of the invention are as follows:
1. The material is distributed over almost all the defibrating drum and not just one side of it. The drum can therefore receive, per unit of length, almost double the amount of material treated in known apparatus.

The power needed for driving the drum is significantly less than in a conventional machine, thanks to this uniformity of distribution.

2. As has already been pointed out, the material coming into contact with the blades of the rotor and then with the inner wall of the drum is ground twice each time the drum rotates.
3. Because of this, the shearing forces no longer depend on the diameter of the rotor.
4. Consequently, for the same capacity, the drum may have a diameter slightly larger than half the diameter of a conventional drum. The length and the retention time can be reduced by about half.

The energy consumed does not exceed that consumed by a conventional apparatus.

The invention is hereinafter described with reference to a preferred embodiment by way of example, shown in the drawings, wherein:

DESCRIPTION OF EXEMPLARY EMBODIMENTS

Figure 1:
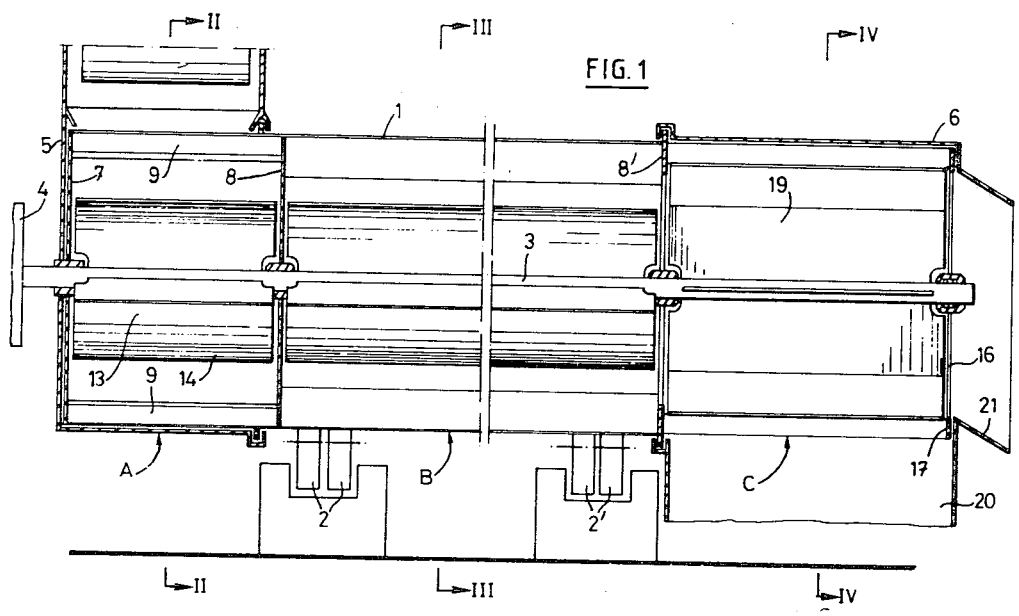
FIG. 1 is an axial longitudinal section through a complete defibrator having, in particular, a defibrating section according to the invention.
Figure 4:
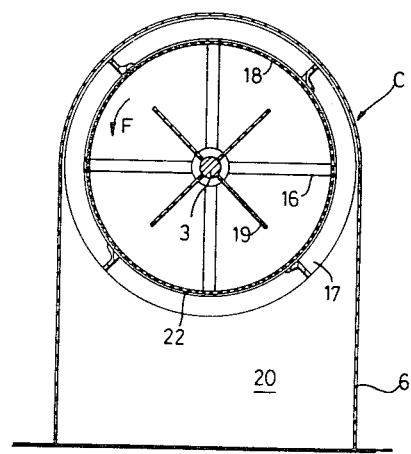
FIG. 4 is a cross section through the apparatus on the line IV—IV in FIG. 1.
Figure 2:
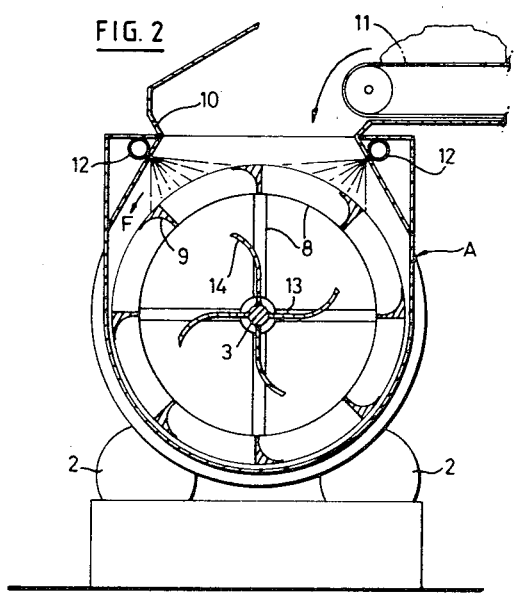
FIG. 2 is a cross section through the apparatus on the line II—II in FIG. 1.

In this preferred embodiment, the apparatus consists of a drum 1 having three sections: a feed section A, a defibrating section B and a sorting section C. The drum is supported at its periphery by rollers 2,2′ at least some of which are drive rollers and drive the drum by friction. A single central shaft 3 connected to a motor 4 passes through all three sections. The machine is also provided with two external housings 5 and 6. The housing 5 contains the shredder section A of th drum 1. The housing 6 contains the sorting section C. The three sections of the machine will now be described in the order in which the material to be treated passes through them.

Section A of the drum 1 comprises a solid cheek 7 which closes the drum at the upstream end, and a perforated cheek 8 which forms a reinforcing partition between section A and section B. These cheeks are connected by profiles 9 having a concavity in front (in the direction of rotation of the drum, indicated by the arrow F). The housing 5 is open at its upper end and is connected to a hopper 10 supplied by a conveyor belt 11. It comprises perforated ducts 12 which project water into the drum, passing through the openings left between the profiles 9. In the centre of the drum and keyed on the shaft 3 there is a rotor consisting of longitudinal blades branching off radially (at 13) from the shaft 3 and curved at their ends (at 14) in the direction of rotation F.

The section B of the drum 1, which is actually the defibrating section, consists of a solid outer casing provided with longitudinal deflectors of triangular section 15 the base of which is contained in the peripheral surface of the drum and the two sides of which are inclined relative to a radial median plane. The inclination of the sides facilitates the detachment of the material enclosed between two successive deflectors, thus preventing the formation of a bridge. The surface which does not come into direct contact with the material acts as a reinforcement for the deflector and the drum as a whole. The sharp ridges formed at the apices of the triangles are oriented towards the shaft 3, at the centre of the drum. The shaft 3 comprises blades 13′, 14′ similar to the blades 13, 14 of section A. These blades rotate in the same direction (F) as the drum, but a speed equal to or more than ten times the angular speed of the drum.

The section C of the drum 1 is separated from section B by a perforated reinforcing partition 8′, analogous to the partition 8. Section C comprises the external housing 6 and the downstream portion of the drum 1, terminating in an almost entirely open partition consisting of reinforcing bars 16 connected by a annular plate 17. In this section, the drum comprises a cylinder 18 perforated over its entire surface with holes 6 to 7 mm in diameter (as shown at 22), and, inside, keyed on the shaft 3, a conventional blade system 19. The housing 6 which encloses the drum, its mounting and the rotor comprises below it a chimney 20 opening in the direction of discharge of the fibres, and an outlet spout 21 for the foreign matter which is to be eliminated.

The operation of the apparatus can be analysed as follows:

The material to be treated, carried by the conveyor belt 11, falls between the profiled bars 9 of the movable drum 1 on to the rotor with blades 13, 14, which projects the material on to the profiles 9, from where it falls back into the bottom of the drum, where the presence of the external housing 5 prevents it from escaping. To ensure that it does not pass upwards through the spaces existing between the bars 9, the dimensions of these spaces and of the blades 13, 14, and the shape of the latter, must be judiciously chosen. Under the effect of the helical shape of the blades 14 and possibly the inclination of the entire machine relative to the horizontal, if such inclination is provided, the material shredded by the mechanical operation, aided by the sprinkling of water supplied through nozzles fed by the ducts 12, passes into section B, the actual defibrating section.

Figure 3:
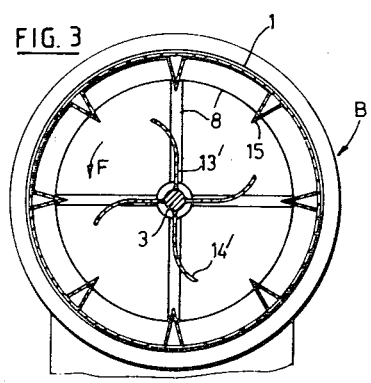
FIG. 3 is a cross section through the apparatus on the line III—III in FIG. 1.

In this section, the material enters partly through the centre, between the blades 13′ and 14′ of the central rotor which is an extension of the shredder. This portion of the material which has already been subjected to impact on making contact with the rotor is again subjected to a crushing action between the blades 13′ and is soon projected, by the curved parts 14′ of the blades, towards the deflectors 15 in the half of the machine which is on the left in FIG. 3. The sharp ridges of the deflectors 15 contribute to the defibrating action. Another fraction of the material, arriving along the deflectors 15 in the lower part of the drum 1, is lifted by the deflectors, from which it slides downwards shortly before reaching the top of the drum. It thus falls on to the blades 13′, 14′ which also project it, as mentioned hereinbefore. All the material, which has finally fallen back several times (in the left-hand part of the machine) into the bottom of the rotor, finally leaves this rotor axially, through the partition 8′, to arrive in the section C, known as the sorting section, the general construction and method of operation of which are known per se. There, it is diluted by the addition of water (provided through nozzles (not shown) located in the upper part of the housing 6) and, urged by the radial blades 19 of the central rotor, it passes through the perforations 22 and escapes into the chimney 20. Foreign matter (wires, metal, plastics) is evacuated through the spout 21.

To give an idea of the superiority of the machine according to the invention over known machines, the actual defibrator (section B) of the invention will now be compared with two known defibrators. All the comparisons are based on the flow rate per 24 hours.

The calculations are made with the aid of the following formulae:

Weight of dry matter in the drum =

$$P = \frac{\pi D_1}{4} - \frac{\pi D_2^2}{4} \times F \times L \times C, \text{ (in Kgs)}$$

Production of dry pulp in 24 hours =

$$Q = \frac{P \times 24 \times 60}{R \times C \times 1000}, \text{ (in tonnes)}$$

where
$D_1$ = diameter measured at the inner edges of the deflectors;
$D_2$ = diameter of drum;
F = degree of filling between the deflectors;
L = length of the defibrating zone;
C = consistency of the dry matter in %
R = retention time in the drum.
A1. Known machine with a drum 2.25 m in diameter, with a length
L = 5.8 m, F = 4/8
P = 799 kg
Q = 63.9 tonnes/24 hours
A2. Machine according to the invention with a drum 2.25 m in diameter, length L = 4 m, $F = \frac{7}{8}$
P = 964 kg
Q = 155 tonnes/24 hours.

B1. Known machine with a drum 3.00 m in diameter,
Length L = 11 m,
F = 4/8
P = 3,238 kg
Q = 259 tonnes/24 hours.

B2. Machine according to the invention with a drum 3.00 min diameter, length L = 6 m, $F = \frac{7}{8}$
P = 3,090 kg
Q = 495 tonnes/24 hours.

The following are the characteristics of a machine according to the invention having small dimensions:
(diameter 1.5 m, L = 4 m, degree of filling $F = \frac{7}{8}$)
P = 428 kg
Q = 68.5 tonnes/24 hours.

This last machine should be compared with the first (A1).

What is claimed is:

1. A defibrator comprising at least one rotary cylindrical drum provided on its inner surface with longitudinal deflectors, driven in rotation and axially supplied with material which is to be defibrated, including, on the inside, a rotor consisting of a shaft coaxial with the cylindrical drum and longitudinal blades branching off radially from the shaft, and having ends curved in the direction of rotation, which are adapted to receive material to be defibrated and projecting it on to the inner wall of the drum.

2. A defibrator according to claim 1, wherein the longitudinal deflectors have a triangular cross section, thus having a sharp ridge towards the axis.

3. A defibrator according to claim 2, wherein the sides of the triangles are inclined relative to a radial median plane.

4. A defibrator according to claim 1, wherein: the inner rotor rotates in the same direction as the drum.

5. A defibrator according to claim 1, wherein: the angular speed of rotation of the rotor is greater than the speed of rotation of the drum.

6. A defibrator according to claim 1, wherein: the speed of rotation of the drum is of the order of 15 to 30 r.p.m. and in that the speed of rotation of the rotor is of the order of 100 to 200 r.p.m.

7. A defibrator according to claim 1, wherein: there are four blades on the rotor.

8. A defibrator according to claim 1, wherein: the retention time of the material in the defibrator is 10 to 20 minutes.

9. A defibrator according to claim 1, wherein: the axis of the drum and the inner rotor are inclined relative to the horizontal.

10. A defibrator according to claim 1, wherein: the blades of the rotor are slightly spiral in the longitudinal direction, so that the material projected on each revolution travels slowly towards the downstream end of the drum.

11. A defibrator according to claim 1, wherein: there is provided, at the top of said defibrating section, a shredder section comprising a rotary drum, the side wall of which is perforated so as to allow the material delivered from an upper hopper to pass through, and a rotor formed of a central shaft and curved blades, analogous to that in the defibrating section.

12. A defibrator according to claim 11, wherein the shaft of the rotor of the shredder section is an extension, in the upstream direction, of the shaft of the defibrating rotor.

13. A defibrator according to any one of claims 11 or 12, wherein the shredder drum is an extension, in the upstream direction, of the defibrating drum.

14. A defibrator according to claim 11, wherein: following the defibrating section, there comprises a sorting section which is known, comprising a perforated drum and rotor coaxial therewith, having a shaft and radial blades.

15. A defibrator according to claim 14, wherein: the shaft of the rotors of the two or more sections constituting it, is common to them.

16. A defibrator according to either one of claims 14 or 15, wherein the drum of the shredder section, the drum of the defibrating section and the drum of the sorting section all are of a common part.

* * * * *